United States Patent
Wild et al.

(10) Patent No.: US 10,649,625 B2
(45) Date of Patent: May 12, 2020

(54) DEVICE AND METHOD FOR ADAPTING THE CONTENT OF A STATUS BAR

(71) Applicant: VOLKSWAGEN AKTIENGESELLSCHAFT, Wolfsburg (DE)

(72) Inventors: Holger Wild, Berlin (DE); Mark Peter Czelnik, Wolfsburg (DE); Frank Althoff, Lehrte (DE)

(73) Assignee: VOLKSWAGEN AG (DE)

( * ) Notice: Subject to any disclaimer, the term of this patent is extended or adjusted under 35 U.S.C. 154(b) by 214 days.

(21) Appl. No.: 15/033,138

(22) PCT Filed: Oct. 29, 2013

(86) PCT No.: PCT/EP2013/072608
§ 371 (c)(1),
(2) Date: Apr. 29, 2016

(87) PCT Pub. No.: WO2015/062634
PCT Pub. Date: May 7, 2015

(65) Prior Publication Data
US 2016/0253049 A1    Sep. 1, 2016

(51) Int. Cl.
*G06F 3/0482* (2013.01)
*B60K 35/00* (2006.01)
(Continued)

(52) U.S. Cl.
CPC ............ *G06F 3/0482* (2013.01); *B60K 35/00* (2013.01); *B60K 37/06* (2013.01); *G01C 21/36* (2013.01); *G06F 3/04817* (2013.01); *G06F 3/04883* (2013.01); *B60K 2370/111* (2019.05); *B60K 2370/113* (2019.05); *B60K 2370/146* (2019.05); *B60K 2370/1438* (2019.05); *B60K 2370/1442* (2019.05); *B60K 2370/1468* (2019.05); *B60K 2370/151* (2019.05)

(58) Field of Classification Search
CPC ............... G06F 3/0482; G06F 3/04883; G06F 3/04817; B60K 35/00; B60K 2350/00
See application file for complete search history.

(56) References Cited

U.S. PATENT DOCUMENTS 6,211,858 B1    4/2001    Moon et al.
7,996,045 B1    8/2011    Bauer et al.
(Continued)

FOREIGN PATENT DOCUMENTS

DE    10140874 A1    3/2003
DE    10360657 A1    7/2005
(Continued)

OTHER PUBLICATIONS

Leonhard, "Windows 7 All-In-One for Dummies", copyright: 2009, Wiley Publishing Inc. ISBN: 978-0-470-48763-1 (Year: 2009).*
(Continued)

*Primary Examiner* — Seth A Silverman
(74) *Attorney, Agent, or Firm* — Barnes & Thornburg LLP (57) ABSTRACT

A device and method for adapting the content of a status bar to a screen. The method includes activation of an input element with respect to the status bar, reception of user input, and adaptation of the contents of the status bar in which additional information is displayed.

13 Claims, 7 Drawing Sheets

(51) Int. Cl.
*G06F 3/0488* (2013.01)
*G06F 3/0481* (2013.01)
*B60K 37/06* (2006.01)
*G01C 21/36* (2006.01)

(56) References Cited

U.S. PATENT DOCUMENTS

| | | | | |
|---|---|---|---|---|
| 2008/0221747 | A1* | 9/2008 | Baumann | B60K 35/00 701/31.4 |
| 2008/0240694 | A1* | 10/2008 | Okazaki | G03B 17/18 396/50 |
| 2010/0185980 | A1 | 7/2010 | Kuo | |
| 2013/0083074 | A1* | 4/2013 | Nurmi | G06F 3/0488 345/650 |
| 2013/0268883 | A1* | 10/2013 | Kim | G06F 3/0485 715/784 |

FOREIGN PATENT DOCUMENTS

| | | |
|---|---|---|
| DE | 102007023290 A1 | 11/2008 |
| WO | 2006108617 A2 | 10/2006 |
| WO | 2011107149 A1 | 9/2011 |

OTHER PUBLICATIONS

Windows7, "Windows 7 Computer", copyright 2009, PDF (Year: 2009).*
Conder et al. "Android Fundamentals: Status Bar Notifications", published: May 9, 2011, tutsplus.com, https://code.tutsplus.com/tutorials/android-fundamentals-status-bar-notifications--mobile-5879 (Year: 2011).*
MobilePearls, "Android Notifications", available: Jun. 12, 2011, mobilepearls.com, https://web.archive.org/web/20110612034714/http://mobilepearls.com/labs/android-notifications/ (Year: 2011).*
Search Report for International Patent Application No. PCT/EP2013/072608; dated Sep. 16, 2014.

* cited by examiner

DEVICE AND METHOD FOR ADAPTING THE CONTENT OF A STATUS BAR

PRIORITY CLAIM

This patent application is a U.S. National Phase of International Patent Application No. PCT/EP2013/072608, filed 29 Oct. 2013, the disclosure of which is incorporated herein by reference in its entirety.

FIELD

Disclosed embodiments relate to a device and to a method for adapting the content of a status bar on a screen. Disclosed embodiments relate, in particular, to improvements in the user-specific composition of information in a status bar of a Human Machine Interface (HMI) of a transportation means.

BACKGROUND

When information is displayed on screens that are part of an HMI, status bars are used to present essential information to a user in a compact form. This often involves using symbols ("icons") for certain functions or operating statuses. The large number of different functions in the field of infotainment, the limited space and diverse customer expectations make it very difficult to select the information to be displayed and means that the selection is always a compromise. Hence it is common practice to display content in the status bar or to remove content therefrom according to a current operating status of a system connected to the HMI. This includes also modifying the icons according to the operating status (e.g., in the field-strength indicator for a cellular network or the current amount of charge in an electrochemical energy storage device).

Illustrative embodiments adapt the information displayed in a status bar better to a user requirement.

SUMMARY

Disclosed embodiments provide a method, a device, a machine-readable medium, and a signal sequence. The method is used to adapt the content of a status bar on a screen, which screen can be embodied as a touch-sensitive display (touchscreen).

BRIEF DESCRIPTION OF THE FIGURES

Exemplary embodiments are described in detail below with reference to the accompanying drawings, in which.

DETAILED DESCRIPTION OF THE DISCLOSED EMBODIMENTS

Disclosed embodiments provide a method, a device, a machine-readable medium, and a signal sequence. The method is used to adapt the content of a status bar on a screen, which screen can be embodied as a touch-sensitive display (touchscreen). The status bar is designed to display a range of information content in a compact form. In particular, the status bar can be arranged at a top edge of the screen. The content of the status bar is largely independent of a second screen content arranged below the status bar. Whereas the second screen content is mainly used for interaction between the user and the HMI relating to operating a predefined range of functions, the content of the status bar is largely displayed by functions actually being executed by the system or according to the current operating status of a system operated using the HMI. The screen, for example, may be part of a Human Machine Interface positioned in the center of the dashboard of a transportation means, in particular, of a road vehicle (e.g., a car). Alternatively or additionally, the screen may also be arranged in an instrument panel, which generally is arranged behind a steering wheel of a car. Another possible application of the disclosed embodiments is a portable electronic device such as a smartphone for instance. According to the disclosed embodiments, an input focus is first steered onto the status bar. In other words, the HMI is informed that the user intends an interaction to modify the status bar. The input focus can be made, for example, by actuating a predefined touch-sensitive region of a touchscreen, by operating a mechanical control, by eye-tracking, by voice input, or the like. Once the status bar has received the input focus, a user input is received for adapting the content of the status bar. The same options available for steering the input focus are suitable for the user input. Of course, steering the input focus and the user input can also be performed by a single operating action (e.g., tapping the status bar). Gesture recognition and finger movements made in contact with the screen are suitable in particular, for adapting the content of the status bar. Adaptation causes the display of information additional to a previously displayed range of information. In other words, it results in an additional icon, additional text or a rearrangement of information in the status bar to adapt the information in the status bar to suit the requirement of the user. Adapting the content of the status bar may not involve additional activation of functions of the HMI or of the system behind the HMI. In other words, although parameters for displaying information in the status bar are changed, functions or statuses usually symbolized in the status bar are not changed by the user input. Hence the disclosed method allows the information content of the status bar to be adapted according to a requirement of a user.

The method also comprises displaying, prior to receiving the user input, information belonging to a first set of operating-status dependent information. This information may be symbols ("icons"), for example, to save space and allow the information to be read regardless of a user's command of the language. The first set of operating-status dependent information does not include the information added in response to adapting the content. In this connection it should be mentioned that displaying additional information does not rule out that some, or even the entire set of information, is removed from the first set of information before the additional information is displayed. This provides the opportunity to expand the extent of the first set of operating-status dependent information with (more relevant) information in response to a user request.

Adapting the content of the status bar may comprise displaying information belonging to a second set of operating-status dependent information, the second set comprising more information than the first set, in particular, one more icon. Alternatively or additionally, the second set can also comprise less information, in particular, one icon less. If, in addition, a user wants a higher information density or better clarity in the status bar, this requirement can be met. Of course it is also possible to replace some or all of the information content, for example, by an ensemble (set of information) that a current user-input has opened, by a generic icon or a notification in text form (e.g., "Media", "Navigation" or "Air conditioning"). This allows a user-specific composition of information displayed in the status bar.

The user input may involve, for example, a finger hovering within a predefined distance range from the screen in a region in front of the status bar. Such a gesture can be detected, for example, using camera systems and/or using capacitive sensors and analyzed. Alternatively or additionally, the user input may involve a gesture that is performed while touching the screen. Examples of such gestures are "single-tap", "double-tap", "long-press" ("press and hold"), "swipe" or (using two fingers) "spread" or "pinch". It has been found that users can employ such gestures intuitively to operate smartphones and tablet PCs.

The method may comprise predefining in a configuration menu for the status bar a first set and/or a second set of information. For instance, a user can configure in a "Settings" area in the second screen area (below the status bar) a multiplicity of combinations of different appearances, or ensembles, for the status bar. In this case, for example, the user can configure and optionally name function groups. Depending on grouped information, automatic naming is also possible on the basis of a generic function family for the selected information. Then the order of the configured information ensembles can be specified by the user or automatically. The order can be used to determine which ensemble follows a currently displayed ensemble in response to a user input. This allows intuitive and user-friendly configuration of the ensembles and operation for changing from a first ensemble to a second ensemble.

The step of adapting the content of the status bar can comprise notification of a status bar displaying a second set of information. In other words, in response to a user input to adapt the status bar, a generic icon for the subsequent set of information or a parent generic term can be displayed (e.g., briefly) to simplify orientation in the display that then follows of the second set of information. Moreover, this allows a rapid second user input if the notified set of information does not meet the user requirement. In at least one disclosed embodiment, the notification can be replaced by the display of the second set of information after a predefined time interval has elapsed without user input. In other words, the user accepts the selected display of the second set of information by not making a response that declines the notification. The content of the status bar can hence be adapted to suit the customer requirement more quickly.

In the above-described notification of the second set of information, the user can also be shown a summary of a multiplicity of topic areas (e.g., a list), from which summary a topic area is selected by means of a further user input. For example, the summary can be shown by a first user input, and the required display of the status bar can be selected by a second user input (single-tap on the relevant list entry). In response to this operating step, more detailed information on the selected topic area is shown in the status bar. For example, a topic area may be denoted by "Air conditioning" or symbolized by a thermometer icon. If the user confirms the display of this topic area, the status bar is filled with various information relating to current settings of the heating and air conditioning system for the vehicle. This allows clear and intuitive selection of the status-bar configuration.

To obtain more detailed information about a predefined topic area, the input focus can be steered in the status bar onto an icon associated with the predefined topic area. In this process, the input focus is not assigned to the status bar as a whole but to a preselection in an ensemble (displayed in a main menu for instance) of different topic areas. The input focus can be assigned, for instance, by tapping the associated icon in the status bar or moving a marker using a rotary pushbutton control. If the input focus is confirmed by a user input, the content of the status bar is adapted, for instance, by displaying a third set of icons, which provide more detailed information about the topic area predefined by the selected icon. This provides the opportunity to display additional information quickly and directly.

The first set of information and the second set of information can each comprise a different combination of icons or text strings from the following group: the current cellular network operator can be identified, for example, by indicating its name or acronym. In addition, the currently measured field strength of the cellular network can be displayed (e.g., by showing a bar diagram). A current fan speed for the heating/air conditioning unit can be displayed (e.g., by a fan symbol and an Arabic numeral). In addition, if the heating/air conditioning unit is in a circulation mode, a bent arrow can be displayed as a symbol for air circulation. The current time (time of day) can be displayed, in particular, with a high priority at a central position in the status bar. The same applies to today's date. If a navigation system is enabled, a destination (e.g., a town name) and/or a destination address and a distance to the destination (e.g., in kilometers) and an estimated time of arrival can be displayed. Moreover, items of information on the status of a steering-wheel heater, a windshield demister or a seat heater can be displayed according to the operating status. Depending on a radio setting, it can be displayed whether radio traffic messages (TP) are output automatically. A symbol (e.g., an envelope) can indicate the presence of unread messages (emails, text messages, voicemails, or the like). If a cellphone is connected to the system, the amount of charge in an energy storage device of the phone can be displayed. This display can include additional information about how the energy storage device is currently being charged, for example. In addition, a short-range wireless data connection (e.g., Wi-Fi, Bluetooth, or the like) can be displayed. As regards audio output, it is possible to show whether the audio system is currently muted or active, for instance by a (crossed-out) loudspeaker symbol, the volume level at which it is playing a current title from a corresponding performer, and the source of the audio output. It is also possible to display information about the road condition (e.g., by showing a symbol of an ice crystal/snowflake) and to warn to drive carefully. In addition, any traffic warnings that have been received via a data link and/or a radio station can be indicated, for example, by an exclamation mark or a hazard symbol. Furthermore, currently used driver assistance systems can be indicated by corresponding symbols. Finally, it is possible to display in the status bar also setpoint/actual interior temperatures (for example, relating to specific sides of the vehicle).

The first set of information and the second set of information may each comprise a plurality of entries from the above-mentioned group. The second set of information here comprises at least one, and optionally two or three, entries that are not contained in the first set of information.

To indicate to users who are still not familiar with the disclosed embodiments the facility to adapt the status bar, an indicator can be displayed in the status bar that prompts the user to interact with the status bar. In particular, a plurality of dots arranged one above the other or dots arranged as triangles (in particular, at the corners of a button) have become established for this purpose in menu bars in computer-based software. Using such indicators improves the intuitive operability of systems according to the disclosed embodiments for potential users.

One option for displaying the different ensembles or sets of information on the status bar is a virtual roller, which can have the cross section of a regular polygon. Such shapes are commonly known in pencils and other writing utensils to prevent unwanted rolling. One flat face of the roller can represent a first set of information, while another flat face of the roller represents a second set of information, etc. A required set of information can hence be selected intuitively by the user tapping the roller with his finger and performing a swipe action upwards or downwards while making contact with the screen. A required set of information is then selected by removing the finger from the surface of the screen so that the roller remains in a position adopted by this point in time. Each of the roller lateral-surfaces defined by the polygon can hence have a set of information (e.g., a user-defined set of information) that the user would like to know in a simultaneous display. Representing the status bar(s), a roller constitutes a particularly fast and intuitive facility for switching between predefined information ensembles.

According to another disclosed embodiment, a device for a vehicle is proposed, which device comprises a screen, an input unit and a processing unit. The device is configured to implement a method as claimed in any of the previous claims. The features and combination of features correspond to those described in connection with the first-stated disclosed embodiment, and correspond so obviously that reference is made to the above embodiments to avoid repetition.

The screen of the disclosed device may be designed to be touch-sensitive (as a touchscreen). Touch-sensitive surfaces constitutes a widely used and established facility for intuitive operation of HMIs. Alternatively or additionally, the screen can also be arranged in an instrument panel, in which it is becoming increasingly common to integrate matrix-structured screens for displaying programmable screen content. Of course both the HMI and the display in the instrument panel of a vehicle can be embodied. In this case, the status bars of both display units are either configured independently of one another or coupled to one another by logic (e.g., likewise configured by a user).

The input unit can comprise, for example, a camera system and/or capacitive sensors. The input unit is thereby designed to detect a finger of a user hovering within a predefined distance range and to associate same with the status bar, in particular, with an icon arranged thereon. Hence as a finger of the user comes closer, the focus is placed onto the status bar, and then when the finger makes contact with the input unit or the screen, the adaptation of the content of the status bar is actuated. Obviously, steering the input focus onto the status bar and receiving the user input need not be performed by separate operating steps but can be performed by a single tap action on the screen, for example. Alternatively, focusing of the status bar can be performed by a movement, and confirmation ("user input") can be made by a voice command, for example. Numerous possible and suitable operating steps are obvious to a person skilled in the art without these steps needing to be described fully in detail.

The processing unit for performing the disclosed method may be a processor inside a Human Machine Interface (HMI). The disclosed embodiments can thereby be realized solely by software code while having recourse to existing hardware that is still available for other functions. This means that the disclosed embodiments can be implemented simply and cheaply.

According to another disclosed embodiment, a machine-readable medium is placed under protection, which medium comprises instructions which when executed on a programmable processor cause the processor to perform a disclosed method as has been described in detail in connection with the first-stated disclosed embodiment. The machine-readable medium may be, for example, a CD, a memory stick, a hard disk, a DVD, or the like.

According to another disclosed embodiment, a signal sequence is proposed, which represents instructions as contained on the protected machine-readable medium. Disclosed embodiments are also implemented by signals distributed using information technology, which can be propagated, for instance, over data lines (e.g., the Internet, an intranet, or the like). Thus a physical data storage medium as the machine-readable medium is not needed to carry out the disclosed method nor to use the disclosed embodiments.

Figure 1:
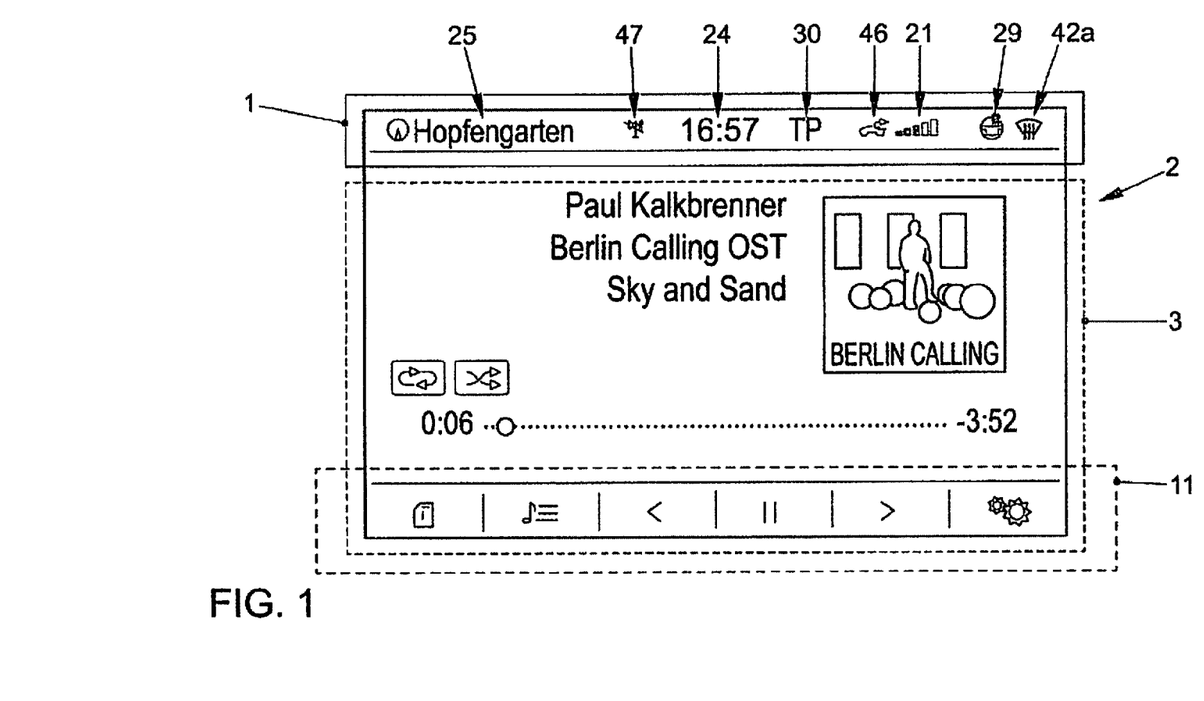
FIG. 1 is a schematic view of a screen content of an HMI of an automobile, which screen content comprises a status bar.

FIG. 1 shows a possible view of a screen content of an HMI of a motor vehicle. A status bar 1 is shown in a top region, which is delimited by a horizontal line. From left to right are displayed a destination 25, the existence of a sufficient signal strength for receiving digital radio 47, the current time of day 24, a symbol for the radio traffic service 30, a phone-connection symbol 46, the current strength 21 of the cellular network, an operating status of the steering-wheel heater 29 and an operating status of the front windshield demister 42a. A main interaction area 3 of the screen 2 is shown below the status bar 1. This area displays an album that is currently playing plus its name, its performer and a title currently being played. In addition, at the bottom edge of the main interaction area 3 are located various buttons 11 for controlling the audio output.

Figure 2:
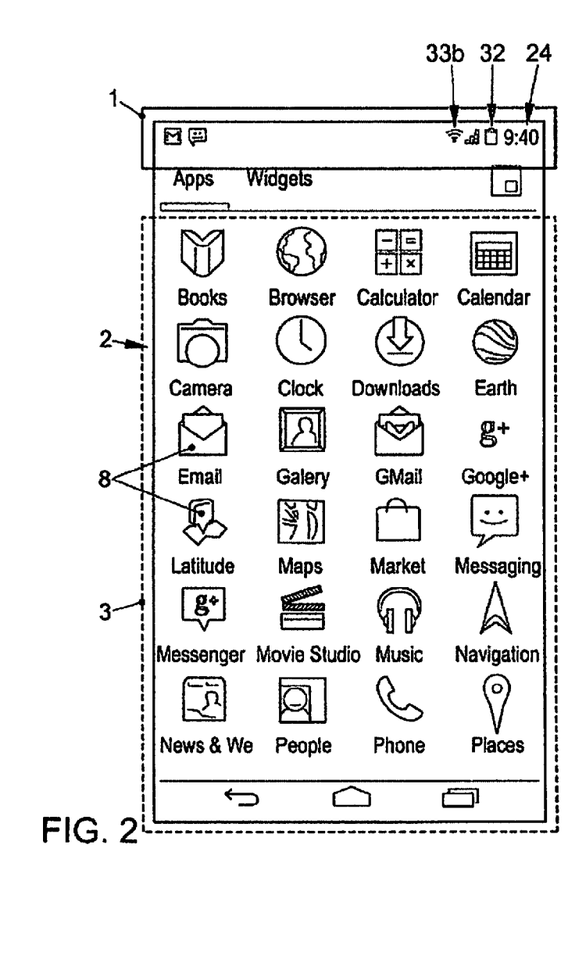
FIG. 2 is a schematic view of a screen content of a known operating system for mobile terminals, which screen content comprises a status bar.

FIG. 2 shows a possible view of a screen content as is known from the Android (registered trademark) operating system. At the top edge of the screen 2 is displayed a status bar 1, in which are displayed a symbol for a Wi-Fi connection 33b, a symbol for the amount of charge in an energy storage device 32 and a current time of day 24. In a main interaction area 3 located thereunder are displayed icons 8 for various functions ("applications" or "apps"). Whereas the main interaction area 3 is designed to receive user inputs, the status bar 1 is designed merely to display various information.

Figure 3:
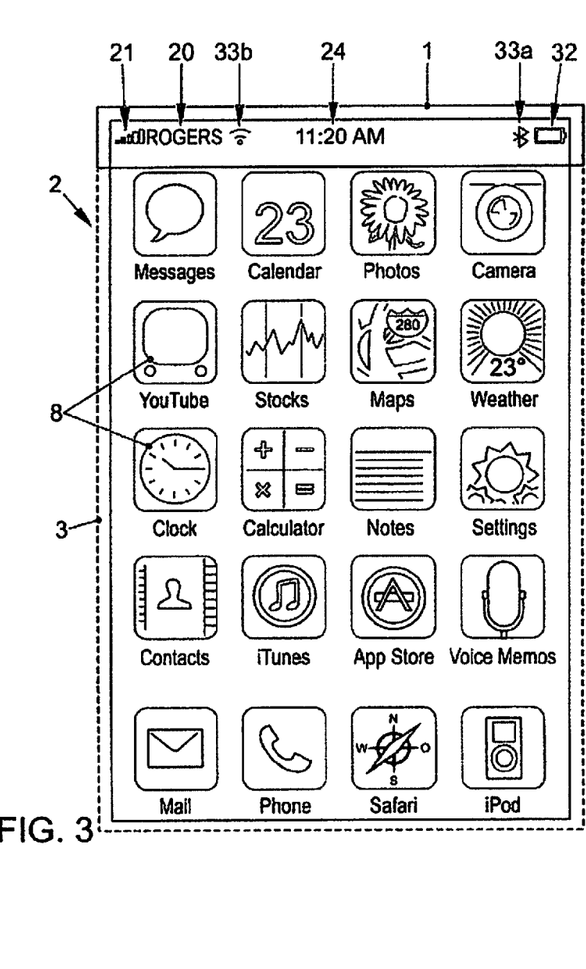
FIG. 3 is a schematic view of a screen content of an alternative known operating system for mobile terminals, which screen content comprises a status bar.

FIG. 3 shows a schematic view of a screen as is known from the IOS (registered trademark) operating system. A status bar 1 is located at the top edge of the screen, in which status bar are displayed from left to right a bar diagram of a current field strength 21 of the cellular network, the name of a cellular network operator 20 being used, the existence of a Wi-Fi connection 33b, the current time of day 24, the existence and the connection status of a Bluetooth connection 33a and a current amount of charge in an energy storage device 32. In a main interaction area 3 located thereunder are arranged icons 8 representing various functions ("applications" or "apps"). The main interaction area 3 is designed to receive user inputs and to display information to the user. The status bar 1, however, is not designed for interaction with the user.

Figure 4A:
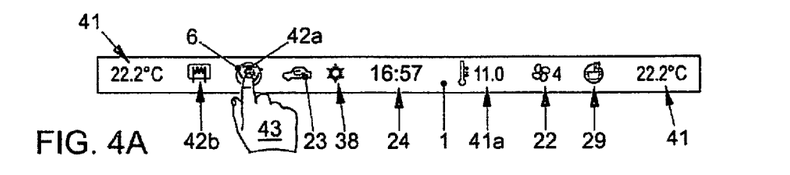
FIGS. 4A-C show a sequence of different appearances of a status bar in response to executing an exemplary embodiment of a disclosed method.
Figure 4B:
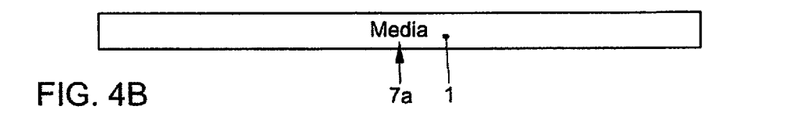
Figure 4C:
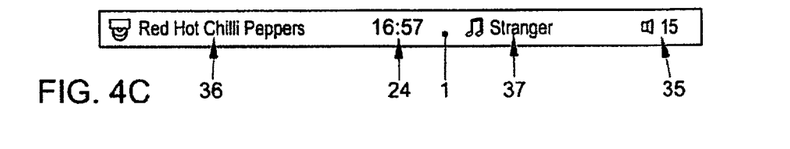
Figure 5A:
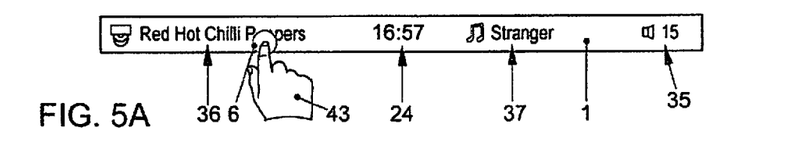
FIGS. 5A-D show an alternative sequence of different appearances of a status bar in response to executing an alternative exemplary embodiment of the disclosed method.
Figure 5B:
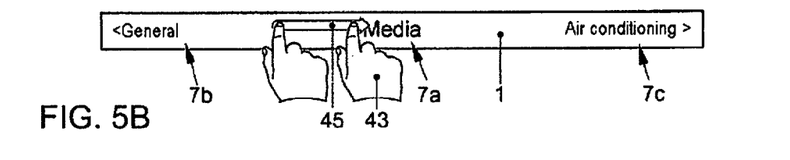
Figure 5C:
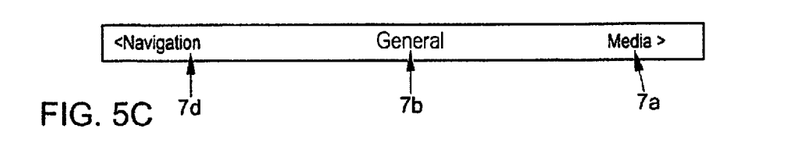
Figure 5D:
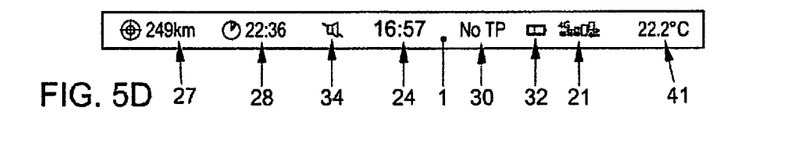
Figure 6A:
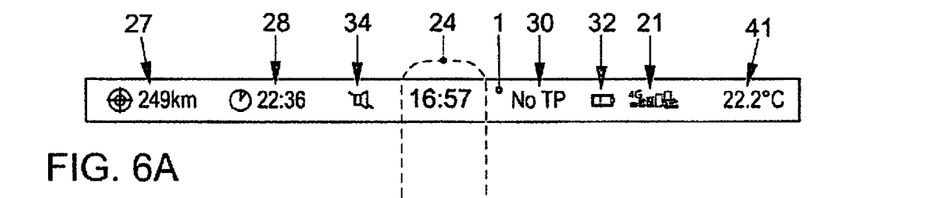
FIGS. 6A-E show a compilation of possible appearances of a status bar in response to performing an exemplary embodiment of a disclosed method.
Figure 6B:
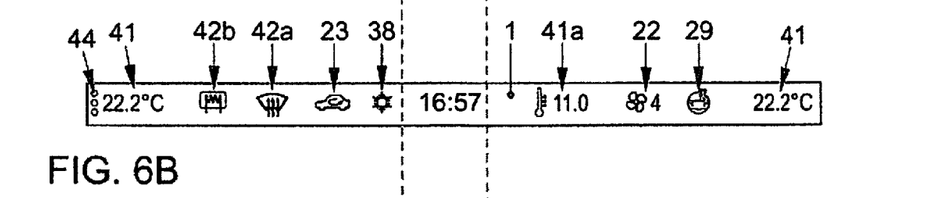
Figure 6C:
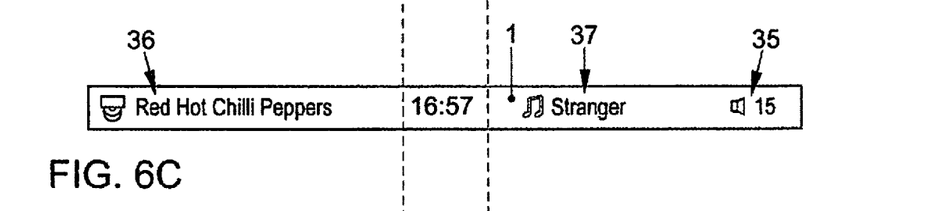
Figure 6D:
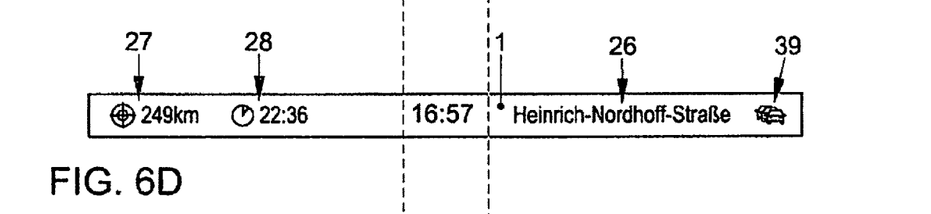
Figure 6E:
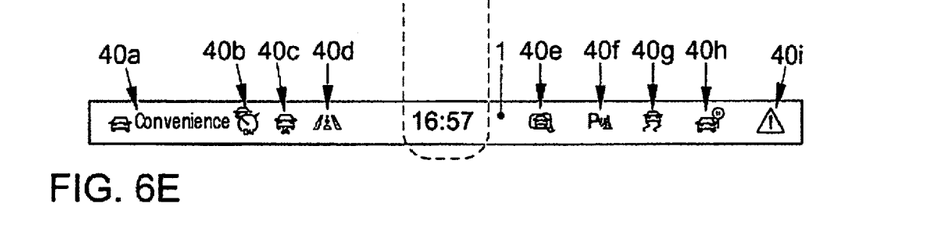
Figure 7A:
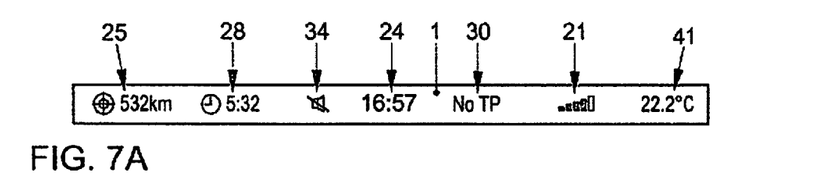
FIGS. 7A-K show a sequence of different appearances of a status bar in response to an exemplary embodiment of a disclosed method.
Figure 7B:
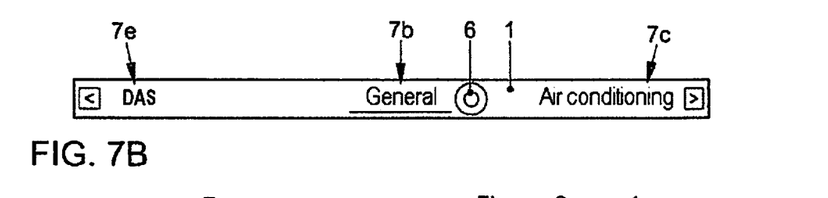
Figure 7C:
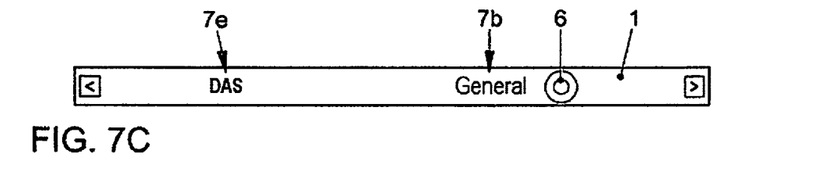
Figure 7D:
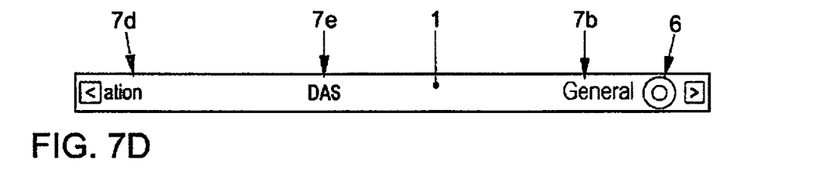
Figure 7E:
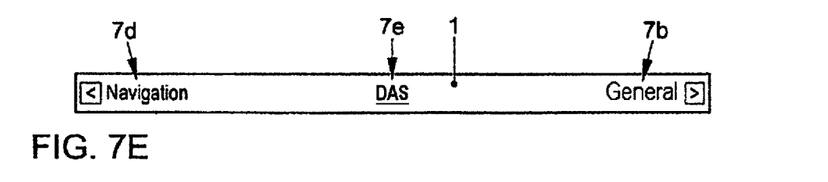
Figure 7F:
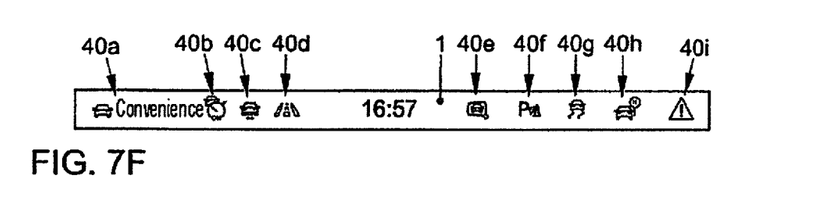
Figure 7G:
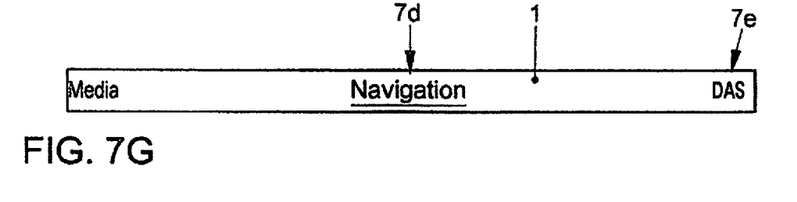
Figure 7H:
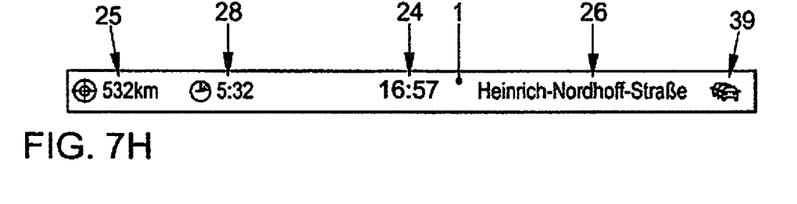
Figure 7I:
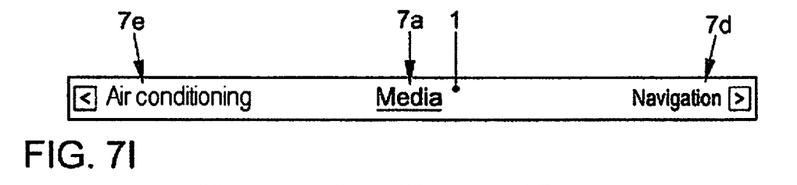
Figure 7J:
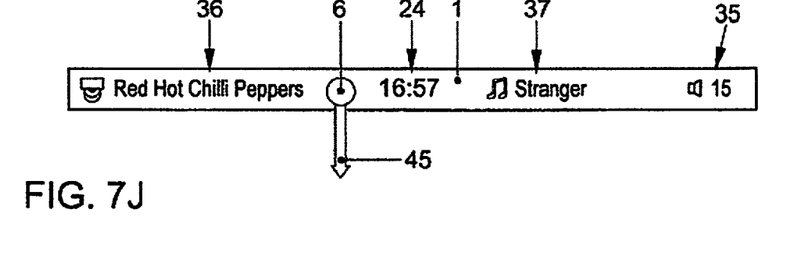
Figure 7K:
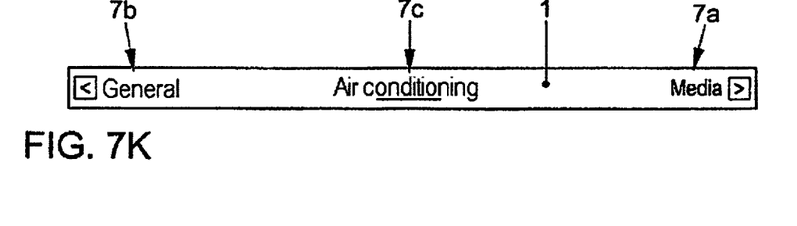

FIG. 4 shows three views a), b), c) of a status bar 1 embodied according to the disclosed embodiments, as they may appear according to a user interaction. The status bar 1 shown in sub-diagram a) displays from left to right a currently set temperature for the left-hand vehicle side 41, an operating status of a rear windshield demister 42b, an operating status of a front windshield demister 42a, a symbol for a circulation mode 23, an icy-road warning symbol 38, the time of day 24, an external temperature 41a, a fan speed 22, the operating status of a steering-wheel heater 29 and a current temperature 41 for the right-hand half of the vehicle. The finger of a user 43 touches the status bar 1, whereby the system receives the input focus 6 and a user input to adapt the content of the status bar 1. In response thereto, as shown in sub-diagram d), notification is given of the "Media" topic area 7a. Since no further user interaction is made, a short time later the appearance (shown in sub-diagram c)) of the status bar 1 is set. From left to right is selected a current performer 36, a current time of day 24, a currently playing title 37 and a currently selected volume level 35. The information shown in sub-diagram c) displays detailed information about the topic area 7a shown in sub-diagram b).

FIG. 5 shows an alternative operating scenario, which could be linked to the scenario presented in FIG. 4. The sub-diagram a) corresponds to the display in sub-diagram c) of FIG. 4. The finger of a user 43 touches the status bar 1 and thereby transfers the input focus 6 to the status bar. In response thereto, the appearance (shown in sub-diagram b)) of the status bar 1 is actuated. Different topic areas 7a, 7b, 7c are presented for selection as text strings in the status bar 1. By a swipe action 45 with the finger, the user 43 moves the text string belonging to the topic area 7b into the center of the status bar 1. The text string belonging to the topic area 7c has left the ensemble shown in sub-diagram c), while a text string belonging to the topic area 7d has moved in. Since no further user input is made, the appearance shown in sub-diagram d) is actuated after a predefined time period. In this appearance, from left to right a kilometer reading shows the remaining distance 25 to a destination, a time shows the estimated time of arrival 28, a crossed-out loudspeaker symbol shows the muted audio system 34, a time shows the current time of day 24, a text string shows the operating status of a radio traffic function 30, an icon shows the amount of charge in an energy storage device 32, a bar diagram shows the current strength 21 of the cellular network and a reading in degrees shows the interior temperature 41. The information shown in sub-diagram d) forms an ensemble of the key information which was predefined for display under the topic area 7b.

FIG. 6 shows an overview of possible appearances of a status bar 1. The view shown in sub-diagram a) corresponds to the view known in the sub-diagram d) of FIG. 5. In sub-diagram b), an indicator 44 has been added to the view shown in sub-diagram a) in FIG. 4, which indicator is used to visualize for a user that the user can interact with the status bar 1 to influence its appearance. The indicator 44 is displayed as a string of three dots arranged in a line one above the other. Sub-diagram c) corresponds to the appearance shown in sub-diagram a) in FIG. 5. In sub-diagram d), from left to right, a kilometer reading shows the distance 27 to the destination, a time value shows the expected time of arrival 28, a time shows the current time of day 24, a text string shows the street name of a destination address 26, and a traffic jam symbol 39 shows a live traffic warning. Sub-diagram e) shows an ensemble for currently used driver assistance systems (DAS). From left to right are shown a drive and gear setting 40a, an operating mode of a cruise control system 40b, an operating mode of a distance-keeping system 40c, an operating mode of a lane-keeping assist system 40d, the current time of day 24, an operating mode of a blind-spot monitoring system 40e, an operating status of a parking assist system 40f, an operating status of an electronic stability program 40g, an operating status of a system for interpreting traffic signs 40h, and a hazard symbol 40i.

FIG. 7 shows views of a status bar 1, as they could be actuated successively by an exemplary embodiment of a disclosed method. Sub-diagram a) shows a layout that corresponds largely with the display from sub-diagram d) in FIG. 5. Receiving an input focus results, in sub-diagram b), in the display of topic areas 7e), 7b) and 7c) in the status bar 1. By a swipe action, the user moves the status bar 1 to the right, between the sub-diagrams b) to e), such that the topic area 7e slides into the center of the status bar 1, the topic area 7b moves to the right edge of the status bar 1 and a further topic area 7d appears at the left-hand edge of the status bar. Since no further user interaction takes place, the centered topic area 7e (driver assistance systems, DAS), in sub-diagram e), is shown underlined, and the appearance of the status bar 1, shown in sub-diagram f), is actuated after a predefined time period. This appearance corresponds to the appearance shown in sub-diagram e) in FIG. 6. By a voice input (not shown) "Change to next view in the status bar", the user opens the topic area 7d ("Navigation"). After a predefined time period has elapsed, the view of the status bar 1 in sub-diagram h) is actuated, which view corresponds to sub-diagram d) in FIG. 6. By a tap action (not shown) on the status bar 1, the central display of the topic area 7a ("Media") gives notification of the subsequent display of detailed information about the current audio output. The appearance shown in sub-diagram j) corresponds to the appearance shown in sub-diagram c) in FIG. 6. By a downwards swipe action 45, with the input focus 6 on the status bar 1, the user finally changes from the detailed view of the topic area 7a to the notification of the display of the topic area 7c ("Air conditioning"). It can be seen from considering the sub-diagram b) that a further operating step in the situation shown in sub-diagram k) would lead to displaying the topic area 7b ("General") if an operating action were not made to decline this change.

Figure 8:
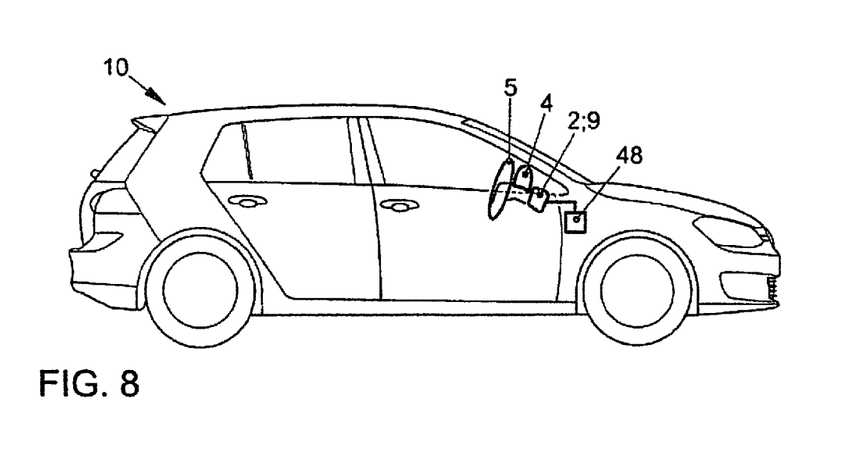
FIG. 8 is a schematic view of a vehicle that is equipped with an exemplary embodiment of a disclosed device.

FIG. 8 shows a schematic diagram of a vehicle 10 as a transportation means, in which an HMI 2 having an input unit embodied as a touchscreen 9 is arranged centrally in the dashboard. Arranged behind a steering wheel 5 is an instrument panel 4, which comprises a further screen. The controller of the HMI 2 comprises a processor 48, which could be used as a processing unit of a disclosed device.

Figure 9:
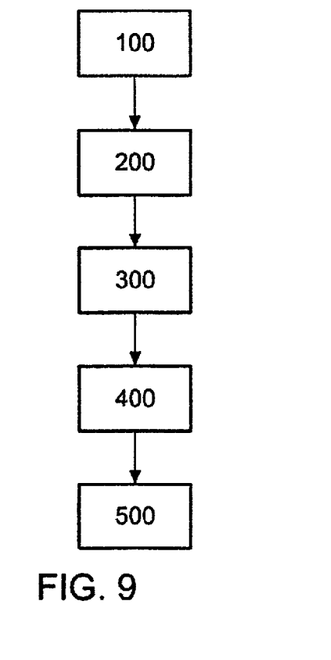
FIG. 9 is a flowchart illustrating steps of an exemplary embodiment of a disclosed method.

FIG. 9 shows a flowchart illustrating steps of an exemplary embodiment of a disclosed method. In step 100, the user defines various sets of information for display in different ensembles in a status bar 1. This is done in a configuration menu, which the user 43 can operate via the touchscreen 9 of the disclosed device. Once the configuration of different appearances of the status bar 1 is complete, the screen 2 displays a first set of information in the status bar 1. By input using a rotary pushbutton, the user assigns the input focus 6 to the status bar 1. In step 400, the user uses a voice command ("Media view") to send a command to adapt the content of the status bar, whereupon in response additional information is displayed in the status bar in step 500.

The operating actions shown shall obviously be understood merely to be examples, to which modifications or additions could be made without departing from the scope of the disclosed embodiments. A horizontal or vertical swipe is proposed as an example of an operating action ("single touch"). A horizontal swipe across the status bar 1 produces the change to the next or previous (generic) status-bar topic. For example, the name of the active (currently selected) topic is displayed in the center of the status bar 1. The display shows to the immediate right and left thereof those topic areas that can be accessed and actuated by centering (swiping) the topic area concerned. Again, the views of possible screen content are merely examples and are a selection that does not claim to be exhaustive. Three-dimensional visualization would likewise be possible. In addition, simply a switch between two different displays of the status bar 1 could be animated in three dimensions by rotating in a suitable swipe input 45, for example, a roller element designed to have 2, 3, 4, 5 or 6 faces.

Although the exemplary embodiments have been explained in association with the figures of the accompanying drawings, any modifications to the exemplary embodiments shown and combinations of features thereof that are possible for a person skilled in the art do not depart from the scope of the disclosed embodiments for which protection is sought by the accompanying claims.

When information is displayed on screens that are part of an HMI, status bars are used to present essential information to a user in a compact form. This often involves using symbols ("icons") for certain functions or operating statuses. The large number of different functions in the field of infotainment, the limited space and diverse customer expectations make it very difficult to select the information to be displayed and means that the selection is always a compromise. Hence it is common practice to display content in the status bar or to remove content therefrom according to a current operating status of a system connected to the HMI. This includes also modifying the icons according to the operating status (e.g., in the field-strength indicator for a cellular network or the current amount of charge in an electrochemical energy storage device). U.S. Pat. No. 7,996,045 B1 discloses an electronic user terminal having a status bar, in which terminal an interaction onto a specific symbol in the status bar causes information to be transferred to a second area in an additional level of a screen.

LIST OF REFERENCES 1 status bar
2 screen (HMI)
3 main interaction area
4 instrument panel
5 steering wheel
6 input focus
7 topic area
8 icons for functions
9 input unit
10 vehicle
11 buttons
20 cellular network operator
21 cellular network field strength
22 fan speed
23 circulation mode
24 time
25 destination
26 destination address
27 distance to destination
28 expected time of arrival
29 steering-wheel heater
30 radio traffic service
31 unread message
32 amount of charge in energy storage device
33 short-range wireless data connection
34 audio output active/muted
35 volume level
36 current performer
37 current title
38 road condition
39 traffic warning
40 status of driver assistance systems
41a temperature of left-hand vehicle side
41b temperature of right-hand vehicle side
42a front windshield demister
42b rear windshield demister
43 user
44 indicator
45 swipe action
48 processor

The invention claimed is:

1. A method for adapting display of content of a status bar on a screen of a Human Machine Interface installed in a transportation vehicle, wherein the Human Machine Interface is configured to control functionality of the transportation vehicle based on input by a user to the Human Machine Interface, the method comprising:
displaying information in the status bar, the displayed information belonging to a first set of transportation vehicle system operating-status dependent information for the functionality of the transportation vehicle;
detecting an indication of a user's focus on the status bar displayed on the screen while the first set of transportation vehicle system operating-status dependent information is displayed in the status bar;
determining which subject matter included in status bar is the subject of the user's focus based on the detected indication of the user's focus;
displaying an indication of the subject matter determined to be the subject of the user's focus;
detecting a subsequent user input indicating confirmation by the user that the displayed indication of the user's subject matter of interest is correct; and
automatically adapting, in response to the detection of the subsequent user input, the content displayed in the status bar by displaying information belonging to a second set of transportation vehicle system operating-status dependent information for the functionality of the transportation vehicle, wherein the adapting the content of the status bar comprises outputting a notification representing the functionality of the second set of transportation vehicle system operating-status dependent information for the functionality of the transportation vehicle, wherein the notification is replaced by the second set of transportation vehicle system operating-status dependent information for the functionality of the transportation vehicle after a predefined time interval has elapsed, wherein inclusion of information in both the first set of transportation vehicle system operating-status dependent information for functionality of the transportation vehicle and the second set of transportation vehicle system operating-status dependent information for functionality of the transportation vehicle is based on a current operating status of one or more transportation vehicle systems included in the transportation vehicle such that information included in the status bar displayed pertains to currently operating transportation vehicle systems, and wherein the second set of transportation vehicle system operating-status dependent information, compared with the first set of transportation vehicle system operating-status dependent information, comprises more information, and/or comprises less information.

2. The method of claim 1, wherein the user input comprises a finger hovering within a predefined distance range from the screen in front of the status bar, on the screen.

3. The method of claim 1, further comprising predefining, in a configuration menu for the status bar, the first set and/or the second set of transportation vehicle system operating-status dependent information for functionality of the transportation vehicle.

4. The method of claim 3, wherein the first set of transportation vehicle system operating-status dependent information and the second set of transportation vehicle system operating-status dependent information each comprise a different combination of icons from the following group:
current cellular network operator,
current field strength of cellular network,
fan speed,
circulation mode,
time,
date,
destination,
destination address,
distance to destination,
estimated time of arrival,
steering-wheel heater,
windshield demister,
radio traffic service,
unread message,
amount of charge in energy storage device,
short-range wireless data connection,
audio output active/muted,
volume level,
current performer,
current title,
road condition,
traffic warning,
status of driver assistance systems, and temperature.

5. The method of claim 1, wherein adapting the content of the status bar comprises displaying a summary of a multiplicity of topic areas, from which a topic area is selected in response to receipt of a further user input and, in response thereto, more detailed information on the selected topic area is shown in the status bar.

6. The method of claim 1, wherein the detected indication of the user's focus indicates the user's focus on an icon associated with a predefined topic area, and the adapting the content of the status bar comprises displaying a third set of icons, which provide more detailed information about the predefined topic area.

7. The method of claim 1, further comprising displaying in the status bar an indicator, which is used to inform the user about the facility to adapt the status bar.

8. The method of claim 1, wherein the status bar is embodied as a roller that has a cross-section of a regular polygon or is animated to rotate on user interaction, wherein the first set of transportation vehicle system operating-status dependent information is arranged on a first lateral surface of the roller, and the second set of transportation vehicle system operating-status dependent information is arranged on a second lateral surface of the roller.

9. A device for a transportation vehicle, the device comprising:
a screen of a Human Machine Interface installed in the transportation vehicle, wherein the Human Machine Interface is configured to control functionality of the transportation vehicle based on input by a user to the Human Machine Interface;
an input unit for receiving user input; and
a processing unit,
wherein the device displays transportation vehicle system operating-status dependent information in the status bar, the displayed transportation vehicle system operating-status dependent information belonging to a first set of transportation vehicle system operating-status dependent information;
wherein the input unit, detects an indication of a user's focus on the status bar displayed on the screen while the first set of transportation vehicle system operating-status dependent information is displayed in the status bar,
wherein, the processing unit determines which subject matter included in status bar is the subject of the user's focus based on the detected indication of the user's focus,
wherein, the screen displays an indication of the subject matter determined to be the subject of the user's focus,
wherein, the input unit detects a subsequent user input indicating confirmation by the user that the displayed indication of the user's subject matter of interest is correct,
wherein, in response to the detection of the subsequent user input, the processing unit automatically adapts content displayed in the status bar on the screen of the Human Machine Interface by displaying transportation vehicle system operating-status dependent information belonging to a second set of transportation vehicle system operating-status dependent information for the functionality of the transportation vehicle, wherein the adapting the content of the status bar comprises outputting a notification representing the functionality of the second set of transportation vehicle system operating-status dependent information for the functionality of the transportation vehicle, wherein the notification is replaced by the second set of transportation vehicle system operating-status dependent information for the functionality of the transportation vehicle after a predefined time interval has elapsed, wherein inclusion of information in both the first set of transportation vehicle system operating-status dependent information and the second set of transportation vehicle system operating-status dependent information is dependent on a current operating status of one or more transportation vehicle systems included in the transportation vehicle such that information included in the status bar displayed pertains to currently operating transportation vehicle systems, and wherein the second set of transportation vehicle system operating-status dependent information, compared with the first set of transportation vehicle system operating-status dependent, comprises more information, and/or comprises less information.

10. The device of claim 9, wherein the screen is touch-sensitive and/or is arranged in an instrument panel.

11. The device of claim 9, wherein the input unit detects a finger of a user hovering within a predefined distance range and associates the same with the status bar.

12. The device of claim 9, wherein the processing unit is a processor inside the Human Machine Interface.

13. A non-transitory machine-readable medium containing instructions which, when executed on a programmable processor, causes the processor to perform a method that comprises:

displaying transportation vehicle system operating-status dependent information in a status bar displayed on a screen of a Human Machine Interface of a transportation vehicle, wherein the Human Machine Interface is configured to control functionality of the transportation vehicle based on input by a user to the Human Machine Interface, wherein the displayed information belonging to a first set of transportation vehicle system operating-status dependent information for functionality of the transportation vehicle;

detecting an indication of a user's focus on the status bar displayed on the screen while the first set of transportation vehicle system operating-status dependent information is displayed in the status bar;

determining which subject matter included in status bar is the subject of the user's focus based on the detected indication of the user's focus;

displaying an indication of the subject matter determined to be the subject of the user's focus;

detecting a subsequent user input indicating confirmation by the user that the displayed indication of the user's subject matter of interest is correct;

automatically adapting, in response to the detection of the subsequent user input, the content displayed in the status bar by displaying information belonging to a second set of transportation vehicle system operating-status dependent information for the functionality of the transportation vehicle, wherein the adapting the content of the status bar comprises outputting a notification representing the functionality of the second set of transportation vehicle system operating-status dependent information for the functionality of the transportation vehicle, wherein the notification is replaced by the second set of transportation vehicle system operating-status dependent information for the functionality of the transportation vehicle after a predefined time interval has elapsed, wherein inclusion of information in both the first set of transportation vehicle system operating-status dependent information and the second set of transportation vehicle system operating-status dependent information is dependent on a current operating status of one or more transportation vehicle systems included in the transportation vehicle such that information included in the status bar displayed pertains to currently operating transportation vehicle systems, and wherein the second set of transportation vehicle system operating-status dependent information, compared with the first set of transportation vehicle system operating-status dependent, comprises more information, and/or comprises less information.

* * * * *